US012599117B2

(12) United States Patent
Logue et al.

(10) Patent No.: US 12,599,117 B2
(45) Date of Patent: Apr. 14, 2026

(54) AQUACULTURE-FEEDING / OXYGEN-DISSOLUTION ASSEMBLY FOR OCEAN APPLICATIONS AND METHOD THEREOF

(71) Applicant: Poseidon Ocean Systems Ltd., Campbell River (CA)

(72) Inventors: Evan Logue, Campbell River (CA); Mathew Stephen Clarke, Campbell River (CA)

(73) Assignee: POSEIDON OCEAN SYSTEMS LTD., Campbell River (CA)

( * ) Notice: Subject to any disclaimer, the term of this patent is extended or adjusted under 35 U.S.C. 154(b) by 0 days.

(21) Appl. No.: 19/036,407

(22) Filed: Jan. 24, 2025

(65) Prior Publication Data
US 2025/0160304 A1 May 22, 2025

Related U.S. Application Data

(63) Continuation of application No. PCT/CA2023/050978, filed on Jul. 20, 2023.
(Continued)

(51) Int. Cl.
*A01K 63/04* (2006.01)
*A01K 61/80* (2017.01)

(52) U.S. Cl.
CPC ............ *A01K 63/042* (2013.01); *A01K 61/80* (2017.01)

(58) Field of Classification Search
CPC ....... A01K 63/042; A01K 63/04; A01K 61/80
See application file for complete search history.

(56) References Cited

U.S. PATENT DOCUMENTS

| 3,109,183 | A | 11/1963 | Overmyer |
| 3,455,115 | A | 7/1969 | Watts et al. |
| | | (Continued) | |

FOREIGN PATENT DOCUMENTS

| CA | 1255166 | A | 6/1989 |
| CA | 2201831 | A1 | 10/1998 |
| | (Continued) | | |

OTHER PUBLICATIONS

Internet webpage, "Venturi Injectors" by Mazzei, dated May 23, 2022 from web.archive.org/web/20220523210154/https://mazzei.net/products/venturi-injectors.
(Continued)

*Primary Examiner* — David J Parsley
*Assistant Examiner* — Carly W. Lynch
(74) *Attorney, Agent, or Firm* — Nicholas Garner; Oyen Wiggs Green & Mutala LLP

(57) ABSTRACT

There is provided an aquaculture assembly including a pump for outputting water of a first concentration of dissolved oxygen. The aquaculture assembly includes an oxygen dissolution system operatively connected to the pump so as to receive said water therefrom and via which water of a second higher concentration of dissolved oxygen is output. The aquaculture assembly includes a manifold operatively connected to the oxygen dissolution system so as to receive said water of the second concentration of dissolved oxygen. The aquaculture assembly includes a plurality of valves in fluid communication with respective outlets of the manifold. A first said valve associated with a closer sea cage is more closed compared to a second said valve associated with a more distant sea cage, to promote a consistent oxygen backpressure across multiple said outlets within a predetermined threshold. The aquaculture assembly includes feed
(Continued)

injection conduits operatively connected to respective said valves.

21 Claims, 2 Drawing Sheets

Related U.S. Application Data

(60) Provisional application No. 63/394,532, filed on Aug. 2, 2022.

(56) References Cited

U.S. PATENT DOCUMENTS

| | | | |
|---|---|---|---|
| 3,635,181 A | 1/1972 | Epple et al. | |
| 3,643,403 A | 2/1972 | Speece | |
| 3,654,885 A | 4/1972 | Godbersen | |
| 4,013,042 A | 3/1977 | Ingold | |
| 4,212,268 A | 7/1980 | Chapman | |
| 4,290,381 A | 9/1981 | Penman | |
| 4,418,634 A | 12/1983 | Gerbus | |
| 4,529,425 A | 7/1985 | McNeil | |
| 4,556,523 A | 12/1985 | Lecoffre et al. | |
| 4,610,219 A | 9/1986 | Morimura | |
| 4,655,156 A | 4/1987 | Svirklys et al. | |
| 4,749,493 A | 6/1988 | Hicks | |
| 4,780,217 A | 10/1988 | Petersen | |
| 4,798,169 A | 1/1989 | Rosen et al. | |
| 4,886,015 A | 12/1989 | Ochs | |
| 4,928,617 A | 5/1990 | Meriwether | |
| 4,940,021 A | 7/1990 | Rytand | |
| 5,014,647 A | 5/1991 | Woltman | |
| 5,054,423 A | 10/1991 | Escobal | |
| 5,056,452 A | 10/1991 | McCain | |
| 5,133,287 A | 7/1992 | Hicks | |
| 5,139,659 A | 8/1992 | Scott | |
| 5,651,706 A | 7/1997 | Kasper | |
| 5,711,787 A | 1/1998 | Neill et al. | |
| 5,732,649 A | 3/1998 | Falcone | |
| 5,762,835 A | 6/1998 | Bassfeld | |
| 5,876,639 A | 3/1999 | Campau | |
| 5,938,983 A | 8/1999 | Sheaffer et al. | |
| 6,120,008 A | 9/2000 | Littman et al. | |
| 6,382,601 B1 | 5/2002 | Ohnari | |
| 7,243,608 B2 | 7/2007 | Knight, Jr et al. | |
| 7,997,563 B2 | 8/2011 | Abe et al. | |
| 8,292,271 B2 | 10/2012 | Fujisato et al. | |
| 8,523,151 B2 | 9/2013 | Tsuji | |
| 8,534,227 B2 | 9/2013 | Coffin et al. | |
| 8,678,354 B2 | 3/2014 | Kerfoot | |
| 8,800,969 B2 | 8/2014 | Yousfan et al. | |
| 9,326,493 B2 | 5/2016 | Han et al. | |
| 10,480,828 B2 | 11/2019 | Correia et al. | |
| 10,598,447 B2 | 3/2020 | Russell et al. | |
| 10,799,827 B2 | 10/2020 | Stuckert et al. | |
| 11,097,229 B2 | 8/2021 | Galbreath-O | |
| 11,305,299 B2 | 4/2022 | Otoguro | |
| 2001/0045673 A1 | 11/2001 | Ogston et al. | |
| 2001/0054673 A1 | 12/2001 | Ku | |
| 2002/0062658 A1 | 5/2002 | Schoenecker et al. | |
| 2004/0149234 A1 | 8/2004 | Mathur et al. | |
| 2004/0168624 A1 | 9/2004 | Moses | |
| 2006/0265940 A1 | 11/2006 | McAleer, Jr. et al. | |
| 2011/0089108 A1 | 4/2011 | Zigerlig | |
| 2012/0103186 A1 | 5/2012 | Pierquin et al. | |
| 2013/0082006 A1* | 4/2013 | Clidence | C02F 1/008 |
| | | | 210/739 |
| 2016/0281770 A1 | 9/2016 | Vankoughnett | |
| 2016/0310914 A1 | 10/2016 | Tsuei | |
| 2020/0390071 A1 | 12/2020 | Beattie et al. | |
| 2021/0204527 A1 | 7/2021 | Clarke et al. | |
| 2022/0095594 A1 | 3/2022 | Dethlefsen et al. | |
| 2022/0161903 A1 | 5/2022 | Lebon et al. | |
| 2025/0144579 A1 | 5/2025 | Logue et al. | |
| 2025/0169478 A1 | 5/2025 | Logue et al. | |

FOREIGN PATENT DOCUMENTS

| | | | | | |
|---|---|---|---|---|---|
| CA | 2460354 | A1 | 3/2003 | | |
| CA | 2793288 | C | 5/2016 | | |
| CA | 3033054 | A1 | 3/2018 | | |
| CA | 3013385 | C | 4/2021 | | |
| CL | 199401303 | | 12/1996 | | |
| CL | 199600435 | | 12/1996 | | |
| CL | 199601039 | | 4/1997 | | |
| CL | 199700505 | | 10/1997 | | |
| CL | 199701413 | | 5/1998 | | |
| CL | 200100515 | | 11/2001 | | |
| CL | 200601818 | | 12/2006 | | |
| CL | 2010000300 | A1 | 7/2010 | | |
| CL | 2014000226 | A1 | 8/2014 | | |
| CL | 2018002696 | U1 | 10/2018 | | |
| CL | 2021000912 | A1 | 8/2021 | | |
| CL | 2025000262 | A1 | 5/2025 | | |
| CN | 102342259 | A | * 2/2012 | ............. | A01K 63/04 |
| CN | 102342259 | B | 3/2013 | | |
| CN | 103395938 | A | 11/2013 | | |
| CN | 103588308 | A | 2/2014 | | |
| CN | 103755046 | A | 4/2014 | | |
| CN | 203884466 | U | 10/2014 | | |
| CN | 104186400 | A | 12/2014 | | |
| CN | 104285876 | A | 1/2015 | | |
| CN | 204132192 | U | 2/2015 | | |
| CN | 205556251 | U | 9/2016 | | |
| CN | 105384264 | B | 5/2018 | | |
| CN | 108633807 | A | 10/2018 | | |
| CN | 108668976 | A | 10/2018 | | |
| CN | 208387642 | U | 1/2019 | | |
| CN | 110447587 | A | 11/2019 | | |
| CN | 110451632 | A | 11/2019 | | |
| CN | 108401974 | B | 9/2020 | | |
| CN | 211847310 | U | 11/2020 | | |
| CN | 113104814 | A | 7/2021 | | |
| CN | 109516578 | B | 9/2021 | | |
| CN | 113996224 | A | 2/2022 | | |
| CN | 114568371 | A | 6/2022 | | |
| CN | 217184427 | U | 8/2022 | | |
| CN | 115067258 | A | 9/2022 | | |
| CN | 217722440 | U | 11/2022 | | |
| EP | 0244954 | A1 | 11/1987 | | |
| EP | 0645080 | A1 | 3/1995 | | |
| EP | 1165449 | B1 | 5/2003 | | |
| EP | 1425963 | B1 | 11/2006 | | |
| EP | 2492004 | B1 | 8/2017 | | |
| ES | 2275059 | T3 | 6/2007 | | |
| FR | 2735463 | A1 | 12/1996 | | |
| GB | 1428529 | A | 3/1976 | | |
| GB | 2236103 | A | 3/1991 | | |
| GB | 2222631 | B | 9/1992 | | |
| GB | 2491085 | B | 11/2013 | | |
| IE | 59339 | B1 | 2/1994 | | |
| JP | H0556730 | A | 3/1993 | | |
| JP | 1994007056 | A | 1/1994 | | |
| JP | H067056 | A | 1/1994 | | |
| JP | H07172804 | A | 7/1995 | | |
| JP | H0970238 | A | 3/1997 | | |
| JP | 2000262836 | A | 9/2000 | | |
| JP | 2001276589 | A | 10/2001 | | |
| JP | 2008302285 | A | 12/2008 | | |
| JP | 4893365 | B2 | 3/2012 | | |
| JP | 5916350 | B2 | 5/2016 | | |
| JP | 2018008223 | A | 1/2018 | | |
| JP | 6310359 | B2 | 4/2018 | | |
| JP | 6661129 | B2 | 3/2020 | | |
| JP | 2021129542 | A | 9/2021 | | |
| KR | 200202728 | Y1 | 11/2000 | | |
| KR | 100281367 | B1 | 4/2001 | | |
| KR | 20110080679 | A | 7/2011 | | |
| KR | 101213829 | B1 | 12/2012 | | |
| KR | 101348591 | B1 | 1/2014 | | |
| KR | 101771124 | B1 | 8/2017 | | |
| KR | 101863769 | B1 | 6/2018 | | |
| KR | 102001225 | B1 | 7/2019 | | |
| KR | 20200025583 | A | 3/2020 | | |
| KR | 20200055333 | A | 5/2020 | | |

(56) References Cited

FOREIGN PATENT DOCUMENTS

| KR | 20210139102 A | 11/2021 |
| KR | 20220147793 A | 11/2022 |
| NO | 149372 B | 1/1984 |
| NO | 341634 B1 | 12/2017 |
| NO | 343706 B1 | 5/2019 |
| NO | 20190989 A1 | 8/2019 |
| NO | 20180928 A1 | 12/2019 |
| WO | 1998001676 A1 | 1/1998 |
| WO | 2001087052 A2 | 11/2001 |
| WO | 2003009679 A1 | 2/2003 |
| WO | 2008035817 A1 | 3/2008 |
| WO | 2011014052 A1 | 2/2011 |
| WO | 2011064538 A1 | 6/2011 |
| WO | 2011120183 A2 | 10/2011 |
| WO | 2011156517 A1 | 12/2011 |
| WO | 2013173936 A1 | 11/2013 |
| WO | 2013182187 A1 | 12/2013 |
| WO | 2015112188 A1 | 7/2015 |
| WO | 2016191834 A1 | 12/2016 |
| WO | 2017075728 A1 | 5/2017 |
| WO | 2018040855 A1 | 3/2018 |
| WO | 2018097736 A1 | 5/2018 |
| WO | 2018117857 A1 | 6/2018 |
| WO | 2020010392 A1 | 1/2020 |
| WO | 2021158122 A1 | 8/2021 |
| WO | 2022012728 A1 | 1/2022 |
| WO | 2023023841 A1 | 3/2023 |
| WO | 2023052825 A1 | 4/2023 |
| WO | 2023062438 A1 | 4/2023 |
| WO | 2024026559 A1 | 2/2024 |

OTHER PUBLICATIONS

Web printout of "Oxygen Saturators" from Pentair, as found via the WayBackMachine and dated Jun. 28, 2019: http://web.archive.org/web/20190628102352/https://pentairaes.com/oxygen-saturators.html.

Web printout of "Oxygen Cones" from Pentair, as found via the WayBackMachine and dated Aug. 11, 2021: http://web.archive.org/web/20210811233416/https://pentairaes.com/products/aeration-oxygenation/oxygen-cones.

"Porous Venturi-Orifice Microbubble Generator for Oxygen Dissolution in Water" by Liew et al, dated Sep. 22, 2020 and as found via the following link: https://www.mdpi.com/2227-9717/8/10/1266.

"Prism® VSA Oxygen Generator", Air Products, 2014.

Wikipedia, "Compressed air dryer", archived version of Dec. 2, 2022.

Wikipedia, "Cyclonic separation", archived version of Jan. 15, 2021.

Wikipedia, "Pressure swing adsorption", archived version of Jan. 5, 2021.

Wikipedia, "Reciprocating compressor", archived version of Dec. 17, 2020.

International Search Report (PCT/CA2019/051367).

Supplementary European Search Report for EP 19 86 7665 completed on Feb. 25, 2022.

Sigma Resource Consultants, Ltd, "Aeration Methods for Salmonid Hatchet), Water Supplies". Department of Fisheries and Oceans (Canada), Apr. 1979 (Apr. 1979), all pages, [retrieved on Sep. 4, 2023 from the Internet https://waves-vagues.dfo-mpo.gc.ca/Library/451.pdf.

Jeroen Kals, "Recirculating aquaculture production systems—An overview of different components, management, economics and technology". Netherlands Institute for Fisheries Research (RIVO), Sep. 2004 (Sep. 2004), Internal Report 04.019, pp. 15, 63-64, 133-145, 162-164, [retrieved on Sep. 4, 2023 (Apr. 9, 2023)]. Retrieved from the Internet: https://edepot.wur.nl/151229.

International Search Report for PCT/CA2023/050907 dated Sep. 26, 2023 (completed Sep. 18, 2023).

International Search Report for PCT/CA2023/050932 dated Sep. 26, 2023 (completed Sep. 18, 2023).

International Search Report for PCT/CA2023/050978 dated Nov. 10, 2023 (completed Oct. 23, 2023).

Edie "Oxygenation of large water bodies", pub Apr. 13, 2005, https://www.edie.net/oxygenation-of-large-water-bodies/.

https://oxymat.com/oxygen-psa-generator-technology/, as obtained via an archived printout dated May 30, 2023: http://web.archive.org/web/20230530082210/https://oxymat.com/oxygen-psa-generator-technology.

https://www.generon.com/product/psa-oxygen-generator/, as obtained via an archived printout dated May 10, 2017: http://web.archive.org/web/20170510195500/https://www.generon.com/product/psa-oxygen-generator.

https://www.plantengineering.com/articles/recovery-and-reheat-process-simplifies-compressed-air-drying/, dated Jul. 1, 2000.

Shain J. Doong, "An Equilibrium Model for Pressure Swing Adsorption Process with Equalization Step", pp. 251-258, Fundamentals of Adsorption, M.D. LeVan (ed.), Kluwer Academic Publishers, Boston, Massachusetts, 1996.

* cited by examiner

AQUACULTURE-FEEDING / OXYGEN-DISSOLUTION ASSEMBLY FOR OCEAN APPLICATIONS AND METHOD THEREOF

BACKGROUND OF THE INVENTION

Field of the Invention

There is provided an aquaculture feeding and oxygen-dissolution assembly for ocean applications, and a method of providing aquaculture feed and/or oxygenated water to a sea cage.

Description of the Related Art

Recirculating aquaculture systems (RAS) are on-land aquaculture systems and may typically involve shallower depths and smaller facilities. Such systems may involve relatively short pipes used for small fluid conveying distances with the pipes being arranged in linear directions (e.g. vertical and/or horizontally). Such systems may also use land accessible electrical power, which is relatively inexpensive, and may thus convey fluids at relatively fast speeds to avoid gas/air-lock problems. Non-limiting examples of recirculating aquaculture systems (RAS) are disclosed in International Patent Application Publication No. WO 2022/012728 and United States Patent Application Publication No. 2022/0095594 A1 to Dethlefsen.

In contrast to recirculating aquaculture systems (RAS), aquaculture assemblies for ocean applications operate in a more dynamic ocean environment. Aquaculture assemblies for ocean applications may thus traditionally include a plurality of conduit systems operating side by side such as: i) an oxygenation system which directs water of higher oxygen content to the sea cage; and ii) a separate feed system which selectively directs food to the sea cage.

Also, aquaculture assemblies for ocean applications tend to be significantly larger in scale in terms of length and depth. A sea cage may be 40 meters by 40 meters and an aquaculture assembly comprising ten sea cages aligned in a row may thus have a length 400-500 meters, resulting in significant pipe conveying distances. Such systems may also contend with water motion from waves, currents, tides and the like, as there is no concrete to mount components thereto as with the RAS and this may cause piping thereof to undulate. Piping for such systems may further include a plurality of anchor points, thus resulting in piping that is non-linear. All of these factors result in significant hydraulic head loss.

In addition, sea cages may be situated in offshore (e.g. a quarter mile from shore) in remote locations, with aquaculture assemblies for ocean applications therefore tending to require yet more expensive energy sources such as diesel-powered generators.

There may accordingly be a need for an improved aquaculture system for ocean-based applications that is more energy-efficient and/or cost effective.

BRIEF SUMMARY OF INVENTION

There is provided, and it is an object to provide, an improved aquaculture assembly, oxygenation assembly thereof for ocean applications, and/or feeding assembly for ocean applications, and a method of providing aquaculture feed and/or oxygenated water to a sea cage, disclosed herein.

The aquaculture assembly as herein described is configured to actively use the above described significant head loss to its advantage. The aquaculture assembly configured for ocean applications: directs pressurized ocean water to one or more sea cages; includes an oxygenation system in fluid communication with the pressurized ocean water; includes a feed system in fluid communication with the pressurized ocean water and in-line with and downstream from the oxygenation system; and is configured to use backpressure otherwise wasted to further promote/assist dissolution gaseous oxygen within the water stream.

There is accordingly provided an aquaculture assembly for ocean applications. The aquaculture assembly includes a conduit system through which pressurized ocean water is pumped to at least one sea cage. The aquaculture assembly includes a feed system operatively connected to the conduit system so as to enable feed to be selectively directed therethrough to the sea cage. The conduit system is curved at least in part, undulates at least in part due to the ocean environment and/or has one or more conveyance distances so as to result in economically significant hydraulic head loss. The aquaculture assembly includes an oxygen dissolution system in fluid communication with the conduit system and positioned in-line with and upstream of the feed system. The oxygen dissolution assembly is configured to use backpressure otherwise wasted to facilitate and/or promote dissolution of gaseous oxygen within the pressurized ocean water.

There is also provided aquaculture assembly for use in ocean applications according to another aspect. The aquaculture assembly includes a pump that receives ocean water and outputs a pressurized water stream. The aquaculture assembly includes an oxygen dissolution system in fluid communication with the pressurized water stream. The aquaculture assembly includes a feed system in-line with the oxygen dissolution system and extending to one or more sea cages, with backpressure from the feed system being used to further promote dissolution of gaseous oxygen within the pressurized water stream.

There is additionally provided an aquaculture assembly according to a further aspect. The aquaculture assembly includes an oxygen dissolution system configured to receive pressurized water therethrough and increase a level of dissolved oxygen therewithin. The aquaculture assembly includes a degassing system downstream of the oxygen dissolution system. The aquaculture assembly includes a feed system in fluid communication with and/or operatively connected to the oxygen dissolution system.

There is further provided an aquaculture assembly according to yet another aspect. The assembly includes an oxygen dissolution system configured to receive pressurized water therethrough and increase a level of dissolved oxygen therewithin. The assembly includes a feed system operatively connected to the oxygen dissolution system. The assembly includes at least one valve in fluid communication with and positioned one or more of: downstream of the oxygen dissolution system; upstream of the feed system; and between the oxygen dissolution system and the feed system.

There is also provided an aquaculture assembly according to another aspect. The aquaculture assembly includes an oxygen dissolution system configured to increase dissolved oxygen levels within water passing therethrough. The aquaculture assembly includes a plurality of feed conduits configured to receive therein feed and portions of the water. The aquaculture assembly includes one or more valves with selective adjustment thereof enabling the extent to which oxygen is dissolved within the water to be adjusted.

There is yet also provided an aquaculture assembly according to a further aspect. The assembly includes an oxygen dissolution system configured to receive pressurized water therethrough and increase a level of dissolved oxygen therewithin. The system includes a feed system. The assembly includes a manifold which is in fluid communication with and/or operatively couples together the oxygen dissolution system and the feed system.

There is further provided an aquaculture assembly according to an additional aspect. The aquaculture assembly includes a pump configured to output water of a first concentration of dissolved oxygen. The aquaculture assembly includes an oxygen dissolution system configured to receive from the pump said water of the first concentration of dissolved oxygen and output water of a second concentration of dissolved oxygen higher than that of the first concentration of dissolved oxygen. The aquaculture assembly includes a manifold configured to receive the water of the second concentration of dissolved oxygen. The aquaculture assembly includes a plurality of valves in communication with respective outlets of the manifold. The aquaculture assembly includes a plurality of feed injection conduits in communication with respective said valves.

There is yet also provided an aquaculture assembly or a feed assembly for aquaculture according to yet an additional aspect. The assembly includes at least one feed conduit configured to receive pressurized water therethrough and feed therein. The assembly includes at least one valve in fluid communication with said at least one feed conduit. The assembly includes gaseous oxygen injected into the water upstream of the feed. The at least one feed conduit and the at least one valve are configured to increase pressure upstream thereof so as to promote dissolving of the gaseous oxygen within said water.

There is further provided an aquaculture assembly according to another aspect. The assembly includes at least one feed conduit and receives pressurized water therethrough and feed therein. The assembly includes gaseous oxygen injected into the water at a location upstream of the feed. The assembly includes at least one valve operatively connected to the at least one feed conduit and positioned between said location and the at least one feed conduit.

There is yet further provided an aquaculture assembly or a feed assembly for aquaculture according to another aspect. The assembly includes a plurality of feed conduits configured to receive pressurized water therethrough and feed therein. The assembly includes one or more valves in fluid communication with respective said feed conduits. The assembly includes gaseous oxygen in fluid communication with the water. The one or more valves create backpressure configured to promote dissolving of the oxygen within the water according to one example.

There is also provided an aquaculture assembly according to a further aspect. The assembly includes an oxygen dissolution system configured to receive pressurized water therethrough and increase a level of dissolved oxygen therewithin. The assembly includes a plurality of water flow meters and flow balancing valves each being adjustable based on one or more outputs of the water flow meters, so as to equalize flow between downstream lines or conduits within a predetermined threshold, whereby backpressure created therefrom is used to promote dissolving of oxygen within the downstream conduits.

There is further provided an aquaculture assembly according to yet another aspect. The assembly includes an oxygen dissolution system configured to increase dissolved oxygen within water passing therethrough. The assembly includes a conduit in fluid communication with the oxygen dissolution system and into which feed is selectively disposable. The assembly includes at least one valve in fluid communication with and downstream of the oxygen dissolution system and positioned upstream of the feed.

There is also provided an aquaculture assembly according to a further aspect. The aquaculture assembly includes an oxygen dissolution system, feed delivery conduits and balancing valves. The oxygen dissolution system, feed delivery conduits and balancing valves are operatively connected together so as to increase pressure in the oxygen dissolution system by positioning the delivery conduits and the balancing valves downstream thereof.

There is additionally provided an aquaculture assembly according to another aspect. The aquaculture assembly includes an oxygen dissolution system. The aquaculture assembly includes a plurality of feed delivery conduits. The aquaculture assembly includes a plurality of balancing valves operatively connected respective the feed delivery conduits. The feed delivery conduits and the balancing valves are operatively connected to and configured so as to increase pressure in the oxygen dissolution system which is upstream thereof.

There is also provided a method of providing aquaculture feed to an aquaculture enclosure according to one aspect. The method includes providing at least one elongate, curved at least in part and/or undulating conduit shaped to convey therethrough pressurized ocean water to the aquaculture enclosure. The method includes disposing feed within the conduit. The method includes injecting gaseous oxygen into the pressurized ocean water upstream of the feed. The method includes using otherwise wasted backpressure from the conduit to facilitate and/or further promote dissolving of the gaseous oxygen therewithin.

There is further provided a method of providing aquaculture feed to an aquaculture enclosure according to another aspect. The method includes disposing feed within a plurality of conduits configured to receive pressurized water therethrough. The method includes injecting gaseous oxygen into the water upstream of the feed. The method includes using backpressure from the conduits and/or the feed so disposed therein to promote dissolving of the gaseous oxygen therewithin.

There is also provided a method of providing aquaculture feed and/or oxygenated water to at least one sea cage according to a further aspect. The method includes pumping pressurized ocean water through a conduit system to the at least one sea cage. The method includes positioning a feed system in fluid communication with the conduit system so as to selectively direct feed to the sea cage. The conduit system is curved at least in part, undulates at least in part due to the ocean environment and/or is sized so as to result in economically significant hydraulic head loss. The method includes positioning an oxygen dissolution system in-line and in fluid communication with the conduit system upstream of the feed system. The method includes using backpressure otherwise wasted to facilitate and/or promote dissolution of gaseous oxygen within the pressurized ocean water.

There is additionally provided a method of providing aquaculture feed and/or oxygenated water to at least one sea cage according another aspect. The method includes outputting a pressurized ocean water stream. The method includes positioning an oxygen dissolution system in fluid communication with the pressurized water stream. The method includes positioning a feed system in-line with the oxygen dissolution system. The feed system extends towards one or more sea cages. The method includes configuring the oxygen dissolution system to actively use backpressure from the feed system to facilitate and/or further promote dissolution of gaseous oxygen within the pressurized water stream.

There is further provided a method of providing aquaculture feed and/or oxygenated water to an aquaculture enclosure according to yet another aspect. The method includes dissolving oxygen into water via an oxygen dissolution system so as to output water of elevated dissolved oxygen. The method includes degassing undissolved gases within the water. The method includes injecting feed into the water of elevated dissolved oxygen so as to form at least one liquid-solid flow of water and feed. The method includes directing the at least one liquid-solid flow of water and feed towards the aquaculture enclosure.

There is also provided a method of providing aquaculture feed and/or oxygenated water to a sea cage according yet a further aspect. The method includes providing an oxygen dissolution system which increases the amount of dissolved oxygen within ocean water passing therethrough. The method includes providing a feed system via which the aquaculture feed is selectively directed towards the sea cage. The method includes overlapping the output of the oxygen dissolution system with the input of the feed system.

There is further provided a method of providing aquaculture feed and/or oxygenated water to a sea cage according to another aspect. The method includes providing an oxygen dissolution system which increases the amount of dissolved oxygen within ocean water passing therethrough. The method includes providing a feed system via which the aquaculture feed is selectively directed towards the sea cage. The method includes arranging the output of the oxygen dissolution system to be the input of the feed system.

There is also provided a method of providing aquaculture feed to an aquaculture enclosure according to an additional aspect. The method includes disposing feed within a conduit configured to receive pressurized water therethrough. The method includes injecting gaseous oxygen into the water upstream of the feed. The method includes using backpressure from the conduit and/or the feed so disposed therein to promote dissolving of the gaseous oxygen therewithin. The method includes directing a mix of said feed and said water of higher dissolved oxygen towards the aquaculture enclosure.

There is yet further provided a method of providing aquaculture feed to an aquaculture enclosure according to yet an additional aspect. The method includes disposing feed within a plurality of conduits configured to receive pressurized water therethrough. The method includes injecting gaseous oxygen into the water upstream of the feed. The method includes using backpressure from the conduits and/or the feed so disposed therein to promote dissolving of the gaseous oxygen therewithin. The method includes directing one or more mixes of said feed and said water of higher dissolved oxygen towards the aquaculture enclosure.

There is also provided a method of providing aquaculture feed according to another aspect. The method includes dissolving oxygen into water via an oxygen dissolution system so as to output water of elevated dissolved oxygen. The method includes splitting the water into a plurality of distribution lines and injecting feed into each said distribution line.

There is further provided a method of providing aquaculture feed according to an additional aspect. The method includes dissolving oxygen into water via an oxygen dissolution system so as to output water of elevated dissolved oxygen. The method includes splitting the water into a plurality of distribution lines and injecting feed into each said distribution line. The method includes adjusting flow through the distribution lines and/or further promoting dissolution of oxygen within the water via water flow balancing valves.

There is also provided a method of providing aquaculture feed and/or oxygenated water to an aquaculture enclosure according to another aspect. The method includes dissolving oxygen into water via an oxygen dissolution system so as to output water of elevated dissolved oxygen. The method includes increasing pressure in the upstream oxygen dissolution system by positioning downstream thereof two or more of a manifold, feed delivery conduits, water flow meters and flow balancing valves.

There is further provided a method of providing aquaculture feed and/or oxygenated water to an aquaculture enclosure according to an additional aspect. The method includes dissolving oxygen into water via an oxygen dissolution system so as to output water of elevated dissolved oxygen. The method includes positioning two or more of a manifold, feed delivery conduits, water flow meters and flow balancing valves downstream of the oxygen dissolution system. The method includes leveraging backpressure from the two or more of said manifold, said feed delivery conduits, said water flow meters and said flow balancing valves, to promote further dissolution of oxygen into the water.

There is also provided use of any one of the above aquaculture assemblies for open bodies of water, ocean applications and/or sea cages.

It is emphasized that the invention relates to all combinations of the above features, even if these are recited in different claims.

Further aspects and example embodiments are illustrated in the accompanying drawings and/or described in the following description.

BRIEF DESCRIPTION OF DRAWINGS

The accompanying drawings illustrate non-limiting example embodiments of the invention.

DESCRIPTION OF THE PREFERRED EMBODIMENTS

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Figure 1:
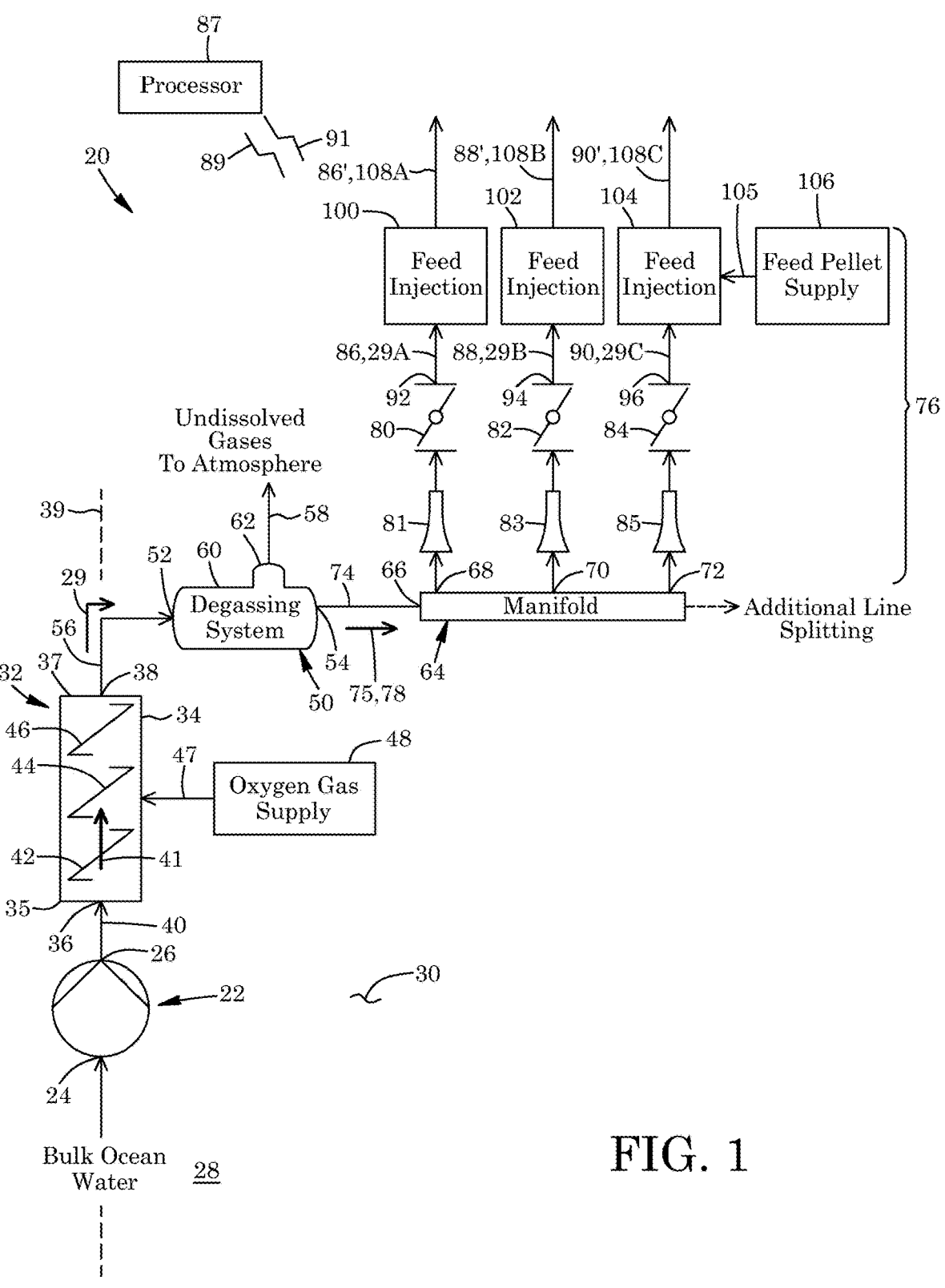
FIG. 1 is a schematic plan view of an aquaculture assembly according to one aspect, the assembly including an oxygen dissolution system and a feed system in fluid communication and in line with the oxygen dissolution system, with an aquaculture enclosure of the aquaculture assembly not being shown.

Referring to the drawings and first to FIG. 1, there is shown an aquaculture assembly 20. The aquaculture assembly may be referred to as an oxygenation assembly for aquaculture or a combination feeding and oxygenation assembly for aquaculture. Aquaculture assembly 20 may also be referred to as an aquaculture feeding assembly or an aquaculture delivery assembly. As a further alternative, the aquaculture assembly may be referred to as a system for co-delivery of oxygenated water and fish feed to an aquaculture cage system.

Aquaculture assembly 20 includes at least one pump, in this non-limiting embodiment a submergible water pump 22. The pump may comprise a variable speed pump; however, this is not strictly required. Pump 22 has an inlet 24 and an outlet 26. The pump in this non-limiting embodiment is positioned below water surface or ocean level 31 seen in FIG. 2 and in this example at depth; however, this is not strictly required. As seen in FIG. 1, inlet 24 of the pump is configured to receive water 28 having a first or lower concentration of dissolved oxygen (DO), such as water from an open body of water, in this example ocean 30. The latter is not strictly required and the body of water may be a lake, river or the like in other embodiments, for example. Pump 22 thus inducts bulk ocean water 28 of an initially low dissolved oxygen (DO) level. The pump is configured to provide motive waterpower to aquaculture assembly 20 as herein described. Pump 22 functions to increase the pressure of water 28 passing therethrough.

Still referring to FIG. 1, aquaculture assembly 20 includes an oxygen dissolution system 32. The oxygen dissolution system may be referred to as an oxygen dissolution device or any oxygenation system or assembly for example. In this non-limiting example, oxygen dissolution system 32 comprises a conduit or vessel 34. The vessel is cylindrical in outer shape in this non-limiting embodiment, though this is not strictly required. Vessel 34 has a first or water inlet 36 and an outlet 38 spaced-apart from the water inlet thereof. The vessel has a bottom 35 in this example adjacent the water inlet thereof and a top 37 in this example adjacent outlet 38 thereof. Vessel 34 is elongate and extends along and about a longitudinal axis 39. The longitudinal axis is at least partially and in this example substantially vertically-extending.

Water inlet 36 of oxygen dissolution system 32 is in fluid communication with outlet 26 of pump 22 via a conduit, in this example pipe 40. The pump is configured to direct water 28 with the lower concentration of dissolved oxygen (DO) towards inlet 36 of oxygen dissolution system 32. Pump 22 thus conveys the pumped fluid into the oxygen dissolution system through to outlet 38 as shown by arrow or direction 41 parallel to longitudinal axis 39. Oxygen dissolution system 32 is thus configured to receive water therethrough, in this example water 28 pressurized via pump 22. The oxygen dissolution system includes therewithin a plurality of barriers or baffles 42, 44 and 46 in this non-limiting embodiment. The baffles are configured to promote mixing of fluid within vessel 34 and may have a variety of shapes to achieve this functionality. Water thus generally passes through vessel 34 along direction 41 via a meandering/circuitous path.

The vessel receives water 28 therewithin, and is also configured to receive oxygen 48 injected therewithin as shown by numeral 47. Oxygen dissolution system 32 may include an oxygen injector to direct oxygen into the vessel. However, this is not strictly required and pressurized oxygen may be supplied and injected into vessel 34 through other means in other examples, such as via a pressurized oxygen tank or an oxygen generator/compressor coupled to the vessel via pressurized hosing for example. The pressurized oxygen tank, oxygen generator/compressor and related hosing may be part of oxygen dissolution system 32. Oxygen 48 injected into vessel 34 may but need not necessarily comprise high purity oxygen gas. The term "gaseous oxygen" is intended to encompass injected gas comprising oxygen in concentrations anywhere in the range of equal to or greater than that found in air, to high purity oxygen gas. Oxygen 48 is configured to be injected into vessel 34 tangential to direction 41 and longitudinal axis 39 of the vessel in this non-limiting embodiment.

Oxygen dissolution system 32, so shaped to promote mixing of water 28 and oxygen 47/48 therewithin and configured to receive water under pressure, is configured to increase dissolved oxygen (DO) levels within the water passing therethrough, and exiting therefrom as seen by water 29. The oxygen dissolution system is configured to receive water 28 of the lower concentration of dissolved oxygen (DO) and output water 29 of a second or higher concentration of dissolved oxygen (DO) higher than that of the lower concentration of dissolved oxygen (DO). Water 29 with the higher concentration of dissolved oxygen (DO) may be referred to as a high dissolved oxygen (DO) water. Oxygen dissolution system 32 thus has an output flow 75 of water. The oxygen dissolution system thus receives oxygen via inlet oxygen gas supply 48 and employs a method of inline dissolution (dissolving gas continuously into a continuous water flow) to raise the dissolved oxygen (DO) level of water 28.

Oxygen dissolution systems per se are known, and the non-limiting example of oxygen dissolution system 32 as herein described is not strictly required. There are a number of different existing oxygen dissolution systems or devices which may be used for aquaculture assembly 20 herein described for increasing the extent to which oxygen is dissolved within water 28.

Not all the injected gaseous oxygen 47/48 may be dissolved into water 28, thus resulting in a bi-phase (liquid-gas) flow leaving oxygen dissolution system 32. Aquaculture assembly 20 accordingly in this non-limiting embodiment includes a degassing system 50. The degassing system may be said to be a part of (but need not be a part of) oxygen dissolution system 32. Degassing system 50 has an inlet 52 and an outlet 54. The degassing system is downstream of oxygen dissolution system 32. Outlet 38 of the oxygen dissolution system is in fluid communication with inlet 52 of degassing system 50 via a conduit, in this example pipe 56.

The degassing system is configured to selectively release undissolved gases from water 29, in this example releasing the undissolved gasses to atmosphere as shown by arrow 58. The bi-phase flow of undissolved gas and water is thus conveyed to degassing system 50 to separate out the gas species from the liquid species and reject the gas species to atmosphere. The degassing system may comprise a vessel or enclosure 60 shaped to receive water 29 therethrough, with the enclosure having one or more apertures 62 via which undissolved gases may selectively exit towards water surface or ocean level 31 seen in FIG. 2. However, this is not strictly required and other types of degassing systems may be used in other embodiments. Referring back to FIG. 1, degassing systems per se, including their various parts and functionings, are well known to those skilled in the art, and degassing system 50 will thus not be described in further detail. The degassing system is configured to output from outlet 54 thereof a flow of liquid comprising substantially water with a high dissolved oxygen (DO) concentration with a minimum or minimal amount of undissolved gas.

Aquaculture assembly 20 includes in this example a manifold 64. The manifold is downstream of oxygen dissolution system 32. Manifold 64 may be referred to as an oxygenated water flow splitting manifold. The manifold has an inlet 66 and a plurality of spaced-apart outlets 68, 70 and 72 in fluid communication with the inlet thereof. The inlet of the manifold is in fluid communication with outlet 54 of degassing system via a conduit, in this example pipe 74. Inlet 66 of manifold 64 is thus in fluid communication with outlet 38 of oxygen dissolution system 32. The manifold is configured to receive water 29 of the second concentration of dissolved oxygen (DO) via inlet 66 thereof. The high-dissolved oxygen (DO) water stream thus passes into manifold 64.

Aquaculture assembly 20 includes a feed system 76. Manifold 64 may be said to be a part of the feed system though this is not strictly required. Feed system 76 is in fluid communication with oxygen dissolution system 32. The feed system is in line with the oxygen dissolution system. Oxygen dissolution system 32 is upstream of the feed system in this example; however, this is not strictly required and the oxygen dissolution system may be downstream of the feed system in other embodiments, for example. Feed system 76 has an input flow 78 of water. Output flow 75 of water of oxygen dissolution system 32 comprises the input flow of water of the feed system in this example.

Feed system 76 includes one or more and in this example a plurality of valves, in this case water flow balancing valves 80, 82 and 84. However, this is not strictly required and valves may be separate from the feed system in other embodiments. Water flow balancing valves 80, 82 and 84 are in fluid communication with respective outlets 68, 70 and 72 of manifold 64. For each valve the actuation thereof selectively controls the extent to which water or liquid flows therethrough. Water flow balancing valves 80, 82 and 84 are selectively adjustable to promote flows of water 29A, 29B and 29C therethrough that are equal to each other within a predetermined threshold in one example.

At least one of and in this example each of the water flow balancing valves is configured to selectively create a backpressure within aquaculture assembly 20. This backpressure functions to further promote dissolution of oxygen 47/48 within the aquaculture assembly, such as within oxygen dissolution system 32, pipes 56 and 74, manifold 64 or otherwise. Water flow balancing valves 80, 82 and 84 are each thus configured such that selective adjustment thereof enables the extent to which oxygen is dissolved within water 29 to be adjusted, and/or further increased compared to a conventional oxygen dissolution system. The valves may be referred to as a backpressure flow equalizing mechanism to improve oxygenation. Valves associated with closer sea cages may be more closed compared to valves associated with more distant sea cages to ensure a consistent oxygen backpressure across multiple outlets.

Aquaculture assembly 20 includes in this non-limiting embodiment a plurality of water flow meters 81, 83 and 85 operatively connected to and in fluid communication with water flow balancing valves 80, 82 and 84. The water flow meters are upstream of the water flow balancing valves and interposed between the water flow balancing valves and outlets 68, 70 and 72 of manifold 64 in this example; however, this is not strictly required. Each of water flow meters 81, 83 and 85 is configured to provide an output, data or measurement of the flow of water or liquid passing therethrough and/or passing through a conduit to which the water flow meter operatively connects. Water flow meters per se, including their various parts and functionings, are well known to those skilled in the art and water flow meters 81, 83 and 85 will accordingly not be described in further detail.

Feed system 76 includes a plurality of distribution lines, in this example feed conduits 86, 88 and 90. The feed conduits may be referred to as feed injection conduits. Feed conduits 86, 88 and 90 have inlets 92, 94 and 96 and outlets in fluid communication with the inlets thereof, respectively, as seen by outlet 98 for conduit 86' in FIG. 2. Referring back to FIG. 1, the feed conduits are in this non-limiting embodiment downstream of oxygen dissolution system 32. However, this is not strictly required and the feed conduits may be upstream of the oxygen dissolution system in other embodiments. Inlets 92, 94 and 96 of feed conduits 86, 88 and 90 are in fluid communication with outlets 68, 70 and 72 of manifold 64 and may couple thereto in one embodiment. The inlets of the feed conduits are thus in fluid communication with output flow 75 of water 29 and outlet 38 of oxygen dissolution system 32 in this non-limiting example. Manifold 64 thus takes the primary inlet seawater line (as shown by pipe 40, 56 and 74) and splits this into as many needed supply lines (as shown by feed conduits 86, 88 and 90) needed for aquaculture enclosure 110 seen in FIG. 2, with one split flow corresponding to one feed delivery location.

Referring back to FIG. 1, each split flow is passed into a respective water flow meter 81, 83 and 85, used to monitor that a correct water flow is being supplied to each feed conduit 86, 88 and 90. To this end, aquaculture assembly 20 in this non-limiting embodiment may include a processor 87 configured to receive input 89 from the water flow meters and based thereon, determine the extent to which the flows are equal within a predetermined threshold. However, a processor is not strictly required. Processor 87 may be configured to selectively actuate or adjust (e.g. via one or more actuators or otherwise) one or more of water flow balancing valves 80, 82 and 84 in response thereto via one or more signals 91 should adjustment in flows be required to maintain water flow balance.

Water flow balancing valves 80, 82 and 84 are in line and in fluid communication with feed conduits 86, 88 and 90. The water flow balancing valves are in fluid communication with the feed conduits, in this example being in fluid communication with inlets 92, 94 and 96 of respective ones of the feed conduits; however, the latter is not strictly required. Water flow balancing valves 80, 82 and 84 in this non-limiting example are interposed between respective outlets 68, 70 and 72 of manifold 64 and inlets 92, 94 and 96 of respective feed conduits 86, 88 and 90 in this example. However, here too this is not strictly required and the water flow balancing valves may be positioned between the inlets and outlets of the feed conduits in other embodiments, for example. Adjustment to the flow of water 29A, 29B and 29C occurs via water flow balancing valves 80, 82 and 84, which are used to equalize the flow between the feed conduits 86, 88 and 90, accounting for short or long piping runs from manifold 64 out to aquaculture enclosure 110 seen in FIG. 2.

As seen in FIG. 1, feed system 76 in this example includes at least one and in this example a plurality of feed injection systems 100, 102 and 104. The feed injection systems may be referred to as feed injection devices. The feed injection systems are configured to selectively inject feed 105 into respective feed conduits 86, 88 and 90. The feed may be referred to as aquaculture feed and may comprise feed pellets from a feed pellet supply 106 in this example; however, this is not strictly required. Flows of equalized, high dissolved oxygen (DO) water 29A, 29B and 29C are directed into individual feed injection systems 100, 102 and 104. The feed injection systems are configured to introduce feed 105 into the pressurized water stream, creating a bi-phase liquid-solid flow. Each feed injection system may comprise any device which enables feed 105 to selectively be positioned within, or upstream or downstream of, respective ones of feed conduits 86, 88 and 90.

The feed conduits in this example are thus configured to selectively receive feed 105 therein via feed injection systems 100, 102 and 104, as well as flows of water 29A, 29B and 29C exiting oxygen dissolution system 32. The feed in this example is thus injected into the feed conduits; however, injection may not strictly speaking be required and the feed may be selectively disposed within the feed conduits in other manners in other embodiments. Selective adjustment of one or more water flow balancing valves 80, 82 and 84 enables liquid-solid flows 108A, 108B and 108C of water and feed within respective feed conduits 86', 88' and 90' (portions of conduits 86, 88 and 90 downstream of feed systems 100, 102 and 104) to be adjusted. Feed conduits 86', 88' and 90' may be referred to as oxygenated waterborne feedlines.

Figure 2:
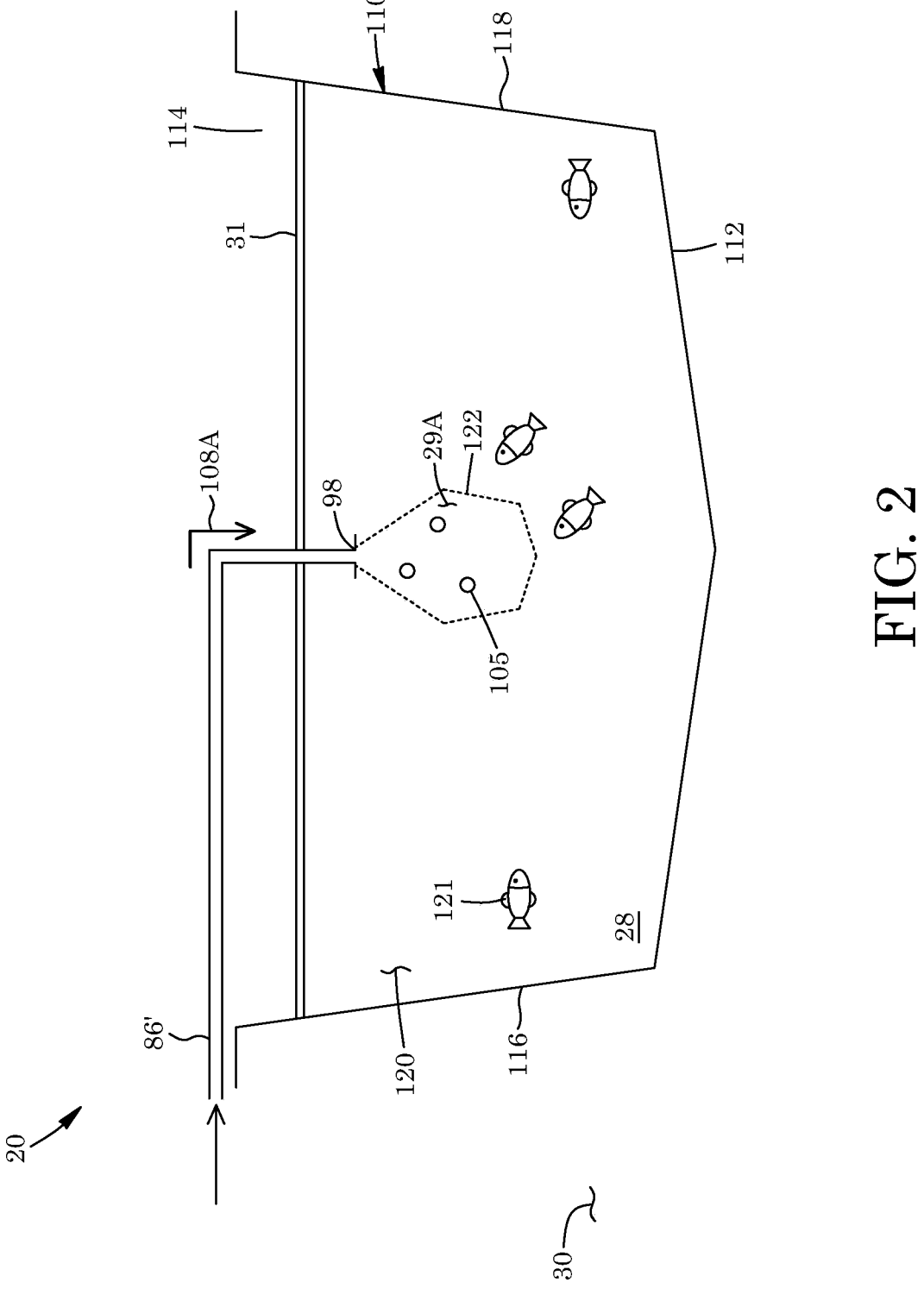
FIG. 2 is a schematic side elevation view of the aquaculture enclosure and a distal end portion of a feed conduit of the aquaculture assembly of FIG. 1, with the feed conduit shown directing a mix of feed and water of an elevated concentration of dissolved oxygen, within the aquaculture enclosure.

As seen in FIG. 2, aquaculture assembly 20 includes aquaculture enclosure 110. The aquaculture enclosure in this non-limiting embodiment has a closed or netted bottom 112, an open top 114 and closed or netted sides 116 and 118 extending about and between the bottom and top thereof in this example. Aquaculture enclosure 110 has an interior 120 extending between the bottom, top and sides thereof. The aquaculture enclosure may comprise a net cage, net pen or other such enclosure configured to receive aquaculture, such as fish 121, therewithin. Aquaculture enclosure 110 may be disposed within and extend about a portion of water 28 having a first or lower concentration of dissolved oxygen (DO), with the water thus being positioned within interior 120 of the aquaculture enclosure. Aquaculture enclosures, including their various parts and functionings, are known per se and aquaculture enclosure 110 will accordingly not be described in further detail.

One or more of feed conduits 86' are shaped to position outlets 98 thereof towards or within aquaculture enclosure 110. In this non-limiting embodiment the outlet may extend through open top 114 and interior 120 of the aquaculture enclosure; however, this is not strictly required. The water/ feed flow 108A, 108B and 108C seen in FIG. 1 is thus conveyed via feed conduits 86, 88, and 90, which may comprise long pipes, over to aquaculture enclosure 110 seen in FIG. 2, where the water/feed flow is delivered into the aquaculture enclosure at depth in this example. The oxygenated waterborne feed is thus distributed to the farm system.

Aquaculture assembly 20 is thus configured to output a liquid-solid flow 108A of water 29A with an elevated concentration of dissolved oxygen (DO) together with feed 105 dispersed therewithin. The aquaculture assembly is configured to output a body of water 122 with an elevated concentration of dissolved oxygen (DO) and within which is disposed feed. The delivered water/feed solution may be said to comprise a cloud of high dissolved oxygen (DO) water 122 centralized at outlet 98 of feed conduit 86' or delivery line. Feed 105 is delivered directly into this cloud for consumption by fish 121.

Conduits 56, 74, 86, 86', 88, 88', 90 and 90' are shown schematically in FIGS. 1 and 2 as extending in linear direction (upwards or sideways) for illustrative purposes only and in fact one or more of the same is curved at least in part and/or non-linear due to: sagging, warping, wave motion and/or a plurality of anchor points thereon and the like. Conduits 56, 74, 86, 86', 88, 88', 90 and 90' may be referred to collectively as a conduit system which has one or more conveyance distances, which is non-linear, which is curved at least in part, which includes a plurality of curved regions and/or undulates at least in part due to the ocean environment so as to result in economically significant hydraulic head loss.

Degassing system 50 functions to inhibit air blocks in the conduit system which may otherwise occur with a continuous injection of gaseous oxygen in a multiphase gas/liquid stream conveyed through a periodically rising/lowered and/ or undulating piping due to the harsh ocean environment. The degassing system may also function to inhibit tri-phase flow (gaseous oxygen, water and feed) which may otherwise lead to airlocks, inhibited flow and the like.

In view of the above, there is also provided a method of providing aquaculture feed 105 and/or oxygenation water 29A to aquaculture enclosure 110. As seen in FIG. 1, the method may include submerging oxygen dissolution system 32; however, this is not strictly required and gaseous oxygen may be injected into the water stream at or adjacent to the surface and/or at a central location. The method may include pumping water 28 of first dissolved oxygen (DO) concentration via pump 22 to the oxygen dissolution system. The method includes dissolving oxygen as shown by numeral 47, into the water via the oxygen dissolution system so as to output water 29 of elevated dissolved oxygen (DO). This may include dissolving oxygen into water 28 via oxygen dissolution system 32 so as to output water of a second dissolved oxygen (DO) concentration higher than that of the first dissolved oxygen (DO) concentration. The method may thus include providing the oxygen dissolution system 32 configured to increase the amount of dissolved oxygen (DO) within water 28 and 29 passing therethrough.

The method may include degassing undissolved gases within the water, in this example via a degassing system 50. The method may include positioning the degassing system upstream of manifold 64, valves 80, 82, 82 and/or feed system 76.

The method includes injecting feed 105 into flows of water 29A, 29B and 29C with elevated dissolved oxygen (DO) so as to form at least one and in this example a plurality of liquid-solid flows 108A, 108B and 108C of water and feed. This may include directing water 29 outputted from oxygen dissolution system 32 to feed conduits 86, 88 and 90 configured to receive feed therein.

The method includes directing the liquid-solid flows of water and feed towards aquaculture enclosure 110 as seen in FIG. 2. The method may include providing feed system 76 (seen in FIG. 1) via which aquaculture feed 105 is selectively directed towards the aquaculture enclosure seen in FIG. 2. The method may include overlapping the output or output flow 75 of oxygen dissolution system 32 seen in FIG. 1 with input or input flow 78 of the feed system. The method may thus include arranging the output of the oxygen dissolution system to be the input of the feed system.

Still referring to FIG. 1, the method may include equalizing within a predetermined threshold, the flow of water 29A, 29B and 29C through feed conduits 86, 88 and 90 via one or more water flow balancing valves 80, 82 and 84. Water flow meters 81, 83 and 85 are in fluid communication with the feed conduits and may be used in conjunction with the water flow balancing valves to this end. The method may include adjusting and/or increasing the extent to which oxygen 47 is dissolved within water 28 and 29 by adjusting the extent to which one or more water flow balancing valves 80, 82 and 84 are opened.

There is also thus disclosed a method of providing oxygenated water 29A, 29B and 29C to aquaculture enclosure 110 seen in FIG. 2. Referring back to FIG. 1, the method includes dissolving oxygen (as seen by numeral 47) within water 28 via oxygen dissolution system 32. The method in this example includes injecting the oxygen into vessel 34 having pressurized water 29 passing therethrough. The method includes injecting feed 105 into the water. The method includes directing a mix of feed and water of higher dissolved oxygen (shown by flow 108A, 108B and 108C) towards aquaculture enclosure 110 seen in FIG. 2.

Referring back to FIG. 1, there is likewise further provided a method of providing aquaculture feed 105 to the aquaculture enclosure seen in FIG. 2. As seen in FIG. 1, the method includes disposing feed 105 within at least one and in this example a plurality of conduits 86, 88 and 90 configured to receive pressurized water 29A, 29B and 29C therethrough. The method includes injecting gaseous oxygen (as shown by numeral 47) into the water so as to promote dissolving thereof therewithin. The method includes directing one or more mixes of said feed and said water of higher dissolved oxygen (shown by flow 108A, 108B and 108C) towards aquaculture enclosure 110 seen in FIG. 2.

Many advantages result from the structure of the present invention. Aquaculture assembly 20 may be said to create a cloud of highly oxygenated (high dissolved oxygen [DO]) water, shown by body of water 122 in FIG. 2, at the immediate outlet 98 where feed 105 is introduced to aquaculture enclosure 110. This is achieved by combining water-borne feeding technology (as shown by feed system 76 in FIG. 1 as a non-limiting example) with in-line oxygenation technology (as shown by oxygen dissolution system 32 and degassing system 50 as a non-limiting example) integrated in a single delivery line. The properties of water-borne feeding of aquaculture assembly 20 as herein described may be leveraged to provide process benefits to the in-line oxygenation technology.

Water flow balancing valves 80, 82 and 84 as herein described may restrict the shorter, less "restrictive" lines or feed conduits 86, 88 and 90 to the flow of the longest, most "restrictive" line or feed conduit. This represents one of the three main pressure loss sources: 1) oxygen dissolution system 32; 2) flow balancing valves; and 3) water delivery line friction. Traditional waterborne feeding systems may utilize a flow balancing solution from a central pump or individual pumps per delivery line. The pressure loss induced by the line friction and balancing solution are used simply to convey the water/feed, which may be to no other benefit.

Aquaculture assembly 20 as herein described may leverage the pressure loss caused by the delivery lines and balancing solution into improved performance via increased pressure in upstream oxygen dissolution system 32. Oxygen dissolution systems, such as the non-limiting example of oxygen dissolution system 32 seen in FIG. 1, may benefit from this additional pressure, meaning increased efficiencies from using this pressure loss productively. Aquaculture assembly 20 as herein described may provide the additional benefit of using water flow balancing valves 80, 82 and 84 to overall increase the system back pressure if additional dissolved oxygen (DO) is required, driving more pressure into oxygen dissolution system 32. The aquaculture assembly as herein described may thus result in higher pressure therewithin, thereby promoting dissolution of oxygen therewithin. Higher pressures of aquaculture assembly 20 compared to a conventional oxygen dissolution system, may function to increase oxygen dissolution rates and promote maximum achievable concentrations of dissolved oxygen (DO).

Undissolved gases that escape degassing system 50 may be conveyed over long feed conduits 86' or piping seen in FIG. 2, which extends between manifold 64 seen in FIG. 1 and aquaculture enclosure 110 seen in FIG. 2. This may function to further increase the overall contact time of the gaseous oxygen, increasing the prospects of dissolution of the oxygen within aquaculture assembly 20. This may also function to reduce the number of airlocks experienced by the system, which may be a problem for low-pressure systems.

Aquaculture assembly 20 as herein described may use one or more pumps which are larger than those that may conventionally be used for an oxygen dissolution system and a feed system on their own, respectively. Larger pumps may result an increase energy efficiency over smaller pumps, providing a reduction in capital and operating expenditures over more smaller pumps.

Aquaculture assembly 20 as herein described may encourage additional feeding through directly creating a high dissolved oxygen (DO) environment at the same system input as the fish feed. High dissolved oxygen (DO) water may function to encourage additional feeding for aquaculture species such as fish 121 seen in FIG. 2, resulting in increased growth thereof. Aquaculture assembly 20 as herein described may thus function to actively encourage additional feeding by aquaculture species. In contrast, traditional oxygenation systems may oxygenate sea pens at point locations spaced-apart from the feed system. The bulk seawater of the cage system is largely unaffected by traditional oxygenation.

Aquaculture assembly 20 as herein described and as seen in FIG. 2, by positively associating a zone of high oxygenation with the feeding location, may result in less feed lost. Fish may tend to school around areas of oxygenated water. Aquaculture assembly 20 as herein described may thus result in a higher amount of the overall input feed being consumed because of increased and diversified fish visitation to the location. The aquaculture assembly as herein described and configured may thus further lower the quantity of feed lost.

Aquaculture assembly 20 as herein described may eliminate the need for separate oxygenation of the ocean fish pen. By delivering highly oxygenated water to aquaculture enclosure 110 seen in FIG. 2, aquaculture assembly 20 as herein described may function to supplant the need for separate oxygen systems currently employed. This may eliminate the in-cage oxygenation gear traditionally required by moving to a centralized system. Aquaculture assembly 20 as herein described, by combining the functions of oxygenation and feed systems in the manner as herein described, may thus effectively reduce overall capital expenses.

It will be appreciated that many variations are possible within the scope of the invention described herein. For example, aquaculture assembly 20 as herein described states that backpressure may be adjusted by actuating one or more valves 80, 82 and 84. In addition or alternatively, backpressure may be adjusted by adjusting the speed of pump 22. In this case, valves 80, 82 and 84 may not strictly be required depending on the number of sea cages involves, their spacing and the like.

Where a component (e.g. an assembly, system, device, apparatus etc.) is referred to herein, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Embodiments of the invention may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs"). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

The invention may also be provided in the form of a program product. The program product may comprise any non-transitory medium which carries a set of computer-readable instructions which, when executed by a data processor, cause the data processor to execute a method of the invention. Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, EPROMs, hardwired or preprogrammed chips (e.g., EEPROM semiconductor chips), nanotechnology memory, or the like. The computer-readable signals on the program product may optionally be compressed or encrypted.

In some embodiments, the invention may be implemented in software. For greater clarity, "software" includes any instructions executed on a processor, and may include (but is not limited to) firmware, resident software, microcode, code for configuring a configurable logic circuit, applications, apps, and the like. Both processing hardware and software may be centralized or distributed (or a combination thereof), in whole or in part, as known to those skilled in the art. For example, software and other modules may be accessible via local memory, via a network, via a browser or other application in a distributed computing context, or via other means suitable for the purposes described above.

Software and other modules may reside on servers, workstations, personal computers, tablet computers, and other devices suitable for the purposes described herein.

Interpretation of Terms

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms. These terms ("a", "an", and "the") mean one or more unless stated otherwise;

"and/or" is used to indicate one or both stated cases may occur, for example A and/or B includes both (A and B) and (A or B);

"approximately" when applied to a numerical value means the numerical value±10%;

where a feature is described as being "optional" or "optionally" present or described as being present "in some embodiments" it is intended that the present disclosure encompasses embodiments where that feature is present and other embodiments where that feature is not necessarily present and other embodiments where that feature is excluded. Further, where any combination of features is described in this application this statement is intended to serve as antecedent basis for the use of exclusive terminology such as "solely," "only" and the like in relation to the combination of features as well as the use of "negative" limitation(s)" to exclude the presence of other features; and "first" and "second" are used for descriptive purposes and cannot be understood as indicating or implying relative importance or indicating the number of indicated technical features.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Where a range for a value is stated, the stated range includes all sub-ranges of the range. It is intended that the statement of a range supports the value being at an endpoint of the range as well as at any intervening value to the tenth of the unit of the lower limit of the range, as well as any subrange or sets of sub ranges of the range unless the context clearly dictates otherwise or any portion(s) of the stated range is specifically excluded. Where the stated range includes one or both endpoints of the range, ranges excluding either or both of those included endpoints are also included in the invention.

Certain numerical values described herein are preceded by "about". In this context, "about" provides literal support for the exact numerical value that it precedes, the exact numerical value ±5%, as well as all other numerical values that are near to or approximately equal to that numerical value. Unless otherwise indicated a particular numerical value is included in "about" a specifically recited numerical value where the particular numerical value provides the substantial equivalent of the specifically recited numerical value in the context in which the specifically recited numerical value is presented. For example, a statement that something has the numerical value of "about 10" is to be interpreted as: the set of statements:

in some embodiments the numerical value is 10;

in some embodiments the numerical value is in the range of 9.5 to 10.5; and if from the context the person of ordinary skill in the art would understand that values within a certain range are substantially equivalent to 10 because the values with the range would be understood to provide substantially the same result as the value 10 then "about 10" also includes:

in some embodiments the numerical value is in the range of C to D where C and D are respectively lower and upper endpoints of the range that encompasses all of those values that provide a substantial equivalent to the value 10

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

As will be apparent to those of skill in the art upon reading this disclosure, each of the individual embodiments described and illustrated herein has discrete components and features which may be readily separated from or combined with the features of any other described embodiment(s) without departing from the scope of the present invention.

Any aspects described above in reference to apparatus may also apply to methods and vice versa.

Any recited method can be carried out in the order of events recited or in any other order which is logically possible. For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, simultaneously or at different times.

Various features are described herein as being present in "some embodiments". Such features are not mandatory and may not be present in all embodiments. Embodiments of the invention may include zero, any one or any combination of two or more of such features. All possible combinations of such features are contemplated by this disclosure even where such features are shown in different drawings and/or described in different sections or paragraphs. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible). This is the case even if features A and B are illustrated in different drawings and/or mentioned in different paragraphs, sections or sentences.

Examples of aquaculture feeding and oxygen-dissolution assemblies for ocean applications, and methods of providing aquaculture feed and/or oxygenated water to a sea cage, have been described. The following clauses are offered as further description.

(1) An aquaculture assembly for ocean applications, the aquaculture assembly comprising: a conduit system through which pressurized ocean water is pumped to at least one sea cage; a feed system operatively connected to the conduit system so as to enable feed to be selectively directed therethrough to the sea cage, wherein the conduit system is curved at least in part, undulates at least in part due to the ocean environment and/or has one or more conveyance distances so as to result in economically significant hydraulic head loss; an oxygen dissolution system in fluid communication with the conduit system and positioned in-line with and upstream of the feed system, with the oxygen dissolution assembly being configured to use backpressure otherwise wasted to facilitate and/or promote dissolution of gaseous oxygen within the pressurized ocean water.

(2) An aquaculture assembly for use in ocean applications, the aquaculture assembly comprising: a pump which receives ocean water and outputs a pressurized water stream; an oxygen dissolution system in fluid communication with the pressurized water stream; and a feed system in-line with the oxygen dissolution system and extending to one or more sea cages, with backpressure from the feed system being used to further promote dissolution of gaseous oxygen within the pressurized water stream.

(3) An aquaculture assembly according to clause 2 or any clause herein, wherein the pressurized water stream is directed along a pathway that is curved at least in part, undulating at least in part due to the ocean environment and/or sized so as to result in significant hydraulic head loss, and the assembly is configured use backpressure therefrom to further promote dissolution of gaseous oxygen within the pressurized water stream.

(4) An aquaculture assembly comprising: an oxygen dissolution system configured to receive pressurized water therethrough and increase a level of dissolved oxygen therewithin; a degassing system downstream of the oxygen dissolution system; and a feed system in fluid communication with and/or operatively connected to the oxygen dissolution system.

(5) An aquaculture assembly according to any clause herein, wherein gaseous oxygen is selectively injected into the oxygen dissolution system.

(6) An aquaculture assembly according to any clause herein, wherein the degassing system selectively releases from the assembly undissolved gases.

(7) An aquaculture assembly according to any clause herein, wherein the degassing system is upstream of the feed system.

(8) An aquaculture assembly according to any clause herein, wherein the degassing system includes an enclosure shaped to receive said water therethrough, the enclosure having one or more apertures extending therein, and the one or more apertures of the enclosure being shaped to enable undissolved gases from the water to selectively exit therefrom at least in part.

(9) An aquaculture assembly comprising: a pump configured to output water of a first concentration of dissolved oxygen; an oxygen dissolution system configured to receive from the pump said water of the first concentration of dissolved oxygen and output water of a second concentration of dissolved oxygen higher than that of the first concentration of dissolved oxygen; a manifold configured to receive the water of the second concentration of dissolved oxygen; a plurality of valves in communication with respective outlets of the manifold; and a plurality of feed injection conduits in communication with respective said valves.

(10) An aquaculture assembly comprising: an oxygen dissolution system configured to receive pressurized water therethrough and increase a level of dissolved oxygen therewithin; a feed system in fluid communication with and/or operatively connected to the oxygen dissolution system, the feed system including a plurality of feed conduits configured to selectively receive feed therein, the feed conduits being in fluid communication with and downstream of an output of the oxygen dissolution system; and one or more valves, each being in fluid communication with a respective said feed conduit.

(11) An aquaculture assembly according to any one of clauses 9 to 10 or any clause herein, wherein the one or more valves are selectively adjustable to promote flows of water through the feed conduits that are equal to each other within a predetermined threshold.

(12) An aquaculture assembly according to any one of clauses 9 to 11 or any clause herein, wherein at least one said valve creates a backpressure which promotes dissolution of oxygen within the assembly.

(13) An aquaculture assembly according to any one of clauses 9 to 12 or any herein, including a manifold, with the one or more valves being interposed between respective outlets of the manifold and respective said feed conduits.

(14) An aquaculture assembly according to clause 13 or any clause herein, wherein the manifold is downstream of the oxygen dissolution system,

(15) An aquaculture assembly comprising: an oxygen dissolution system configured to increase dissolved oxygen levels within water passing therethrough; a plurality of feed conduits configured to receive therein feed and portions of the water; and one or more valves with selective adjustment thereof enabling the extent to which oxygen is dissolved within the water to be adjusted.

(16) An aquaculture assembly according to clause 15 or any clause herein, wherein the one or more valves are in fluid communication with respective said feed conduits.

(17) An aquaculture assembly according to any one of clauses 9 to 16 or any clause herein, wherein the one or more valves are upstream of said feed conduits.

(18) An aquaculture assembly according to any one of clauses 9 to 17 or any clause herein, wherein selective adjustment of the one or more valves enables liquid-solid flows of water and feed within respective said feed conduits to be adjusted.

(19) An aquaculture assembly comprising: at least one feed conduit configured to receive pressurized water therethrough and feed therein; at least one valve in fluid communication with said at least one feed conduit upstream of the feed; and gaseous oxygen in fluid communication with the water, with backpressure resulting from the at least one said valve promoting dissolving of the oxygen within the water.

(20) An aquaculture assembly comprising: a plurality of feed conduit configured to receive pressurized water therethrough and feed therein; one or more valves in fluid communication with respective said feed conduits upstream of the feed; and gaseous oxygen in fluid communication with the water, with backpressure resulting from said one or more valves promotes dissolving of the oxygen within the water.

(21) An aquaculture assembly according to any one of clauses 19 to 20 or any clause herein, including an oxygen dissolution system in fluid communication with and upstream of each said feed conduit, the oxygen dissolution system being configured to further promote dissolution of said oxygen within said water.

(22) An aquaculture assembly according to any one of clauses 9 to 21, or any clause herein, wherein each said valve is a flow balancing said valve.

(23) An aquaculture assembly according to any clause herein, wherein the feed system is in line with the oxygen dissolution system.

(24) An aquaculture assembly according to any clause herein, wherein the oxygen dissolution system is upstream from the feed system.

(25) An aquaculture assembly according to any clause herein, wherein the oxygen dissolution system has an output flow of water, wherein the feed system has an input flow of water, wherein the input flow of water of the feed system is the output flow of water of the oxygen dissolution system.

(26) An aquaculture assembly according to any clause herein, wherein the feed system includes a plurality of feed conduits configured to selectively receive feed therein, the feed conduits being in fluid communication with the oxygen dissolution system.

(27) An aquaculture assembly according to any clause herein, wherein the feed is injected into the feed conduits.

(28) An aquaculture assembly according to any clause herein, wherein the feed comprises food pellets.

(29) An aquaculture assembly according to any clause herein, including a plurality of feed injection systems configured to selectively inject feed into respective said feed conduits.

(30) An aquaculture assembly according to any clause herein, including a pump configured to direct water with a first concentration of dissolved oxygen towards the oxygen dissolution system.

(31) An aquaculture assembly according to any clause herein, including a degassing system downstream of the oxygen dissolution system and upstream of the feed system

(32) An aquaculture assembly according to any clause herein, wherein the assembly is configured to output a liquid-solid flow of water with an elevated concentration of dissolved oxygen together with feed dispersed therewithin.

(33) An aquaculture assembly according to any clause herein, wherein the assembly is configured to output a body of water with an elevated concentration of dissolved oxygen and within which is disposed feed.

(34) An aquaculture assembly according to any clause herein for use with an open body of water.

(35) An aquaculture assembly according to any clause herein for ocean-based applications.

(36) An aquaculture assembly according to any clause herein for sea cages.

(37) An aquaculture assembly comprising: an oxygen dissolution system configured to receive pressurized water therethrough and increase a level of dissolved oxygen therewithin; a feed system operatively connected to the oxygen dissolution system; and at least one valve in fluid communication with and positioned downstream of the oxygen dissolution system.

(38) An aquaculture assembly comprising: an oxygen dissolution system configured to receive pressurized water therethrough and increase a level of dissolved oxygen therewithin; a feed system operatively connected to the oxygen dissolution system; and at least one valve in fluid communication with and positioned upstream of the feed system.

(39) An aquaculture assembly according to any clause herein, including at least one water flow meter downstream of the oxygen dissolution system.

(40) An aquaculture assembly according to any clause herein, wherein the at least one said water flow meter is in fluid communication with the at least one said valve.

(41) An aquaculture assembly according to any clause herein, wherein the at least one said water flow meter is upstream of the feed system.

(42) An aquaculture assembly according to any clause herein, wherein selective adjustment of the at least one said valve enables the extent to which oxygen is dissolved within the water to be adjusted.

(43) An aquaculture assembly according to any clause herein, wherein each said valve is positioned such that adjustment of the extent to which oxygen is dissolved within the water via said valve is independent of feed rate.

(44) An aquaculture assembly according to any clause herein, wherein each said valve is positioned to inhibit damage to the feed.

(45) An aquaculture assembly according to any clause herein, including a plurality of water flow meters downstream of the oxygen dissolution system, the plurality of water flow meters being in fluid communication with respective feed conduits, and including a processor in communication with the plurality of water flow meters, with the processor being configured to determine the extent to which water flows passing through said feed conduits are equal within a predetermined threshold.

(46) An aquaculture assembly according to any clause herein, wherein the processor is in communication with the plurality of valves, with the processor being configured to selectively actuate or adjust one or more of the plurality of valves in response to the plurality of water flow meters.

(47) An aquaculture assembly according to any clause herein, wherein the processor is configured to selectively actuate or adjust one or more of the plurality of valves based on input from the water flow meters so as to promote water flows within the feed conduits that are equal within a predetermined threshold.

(48) An aquaculture assembly according to any clause herein, wherein the processor is configured to selectively adjust the extent to which oxygen is dissolved within the feed conduits by selectively adjusting one or more of the plurality of valves.

(49) An aquaculture assembly comprising: an oxygen dissolution system configured to receive pressurized water therethrough and increase a level of dissolved oxygen therewithin; and a plurality of water flow meters and flow balancing valves each being adjustable based on one or more outputs of the water flow meters, so as to equalize flow between downstream lines or conduits within a predetermined threshold, with backpressure created therefrom being used to promote dissolving of oxygen within the downstream conduits.

(50) An aquaculture assembly comprising: an oxygen dissolution system configured to receive pressurized water therethrough and increase a level of dissolved oxygen therewithin; a feed system; and a manifold which operatively couples together the oxygen dissolution system and the feed system.

(51) An aquaculture assembly comprising: an oxygen dissolution system configured to receive pressurized water therethrough and increase a level of dissolved oxygen therewithin; a feed system; and a manifold via which the oxygen dissolution system and the feed system are in fluid communication.

(52) An aquaculture assembly comprising: an oxygen dissolution system configured to increase dissolved oxygen levels within water passing therethrough; a plurality of feed conduits configured to receive therein feed and portions of the water; and one or more valves configured such selective adjustment thereof enables the extent to which oxygen is dissolved within the water to be adjusted.

(53) An aquaculture assembly comprising: at least one feed conduit configured to receive pressurized water therethrough and feed therein; at least one valve in fluid communication with said at least one feed conduit; and gaseous oxygen injected into the water upstream of the feed, wherein the at least one feed conduit and the at least one valve are configured to increase pressure upstream thereof so as to promote dissolving of the gaseous oxygen within said water.

(54) An aquaculture assembly comprising: at least one feed conduit and receive pressurized water therethrough and feed therein; gaseous oxygen injected into the water at a location upstream of the feed; and at least one valve operatively connected to the at least one feed conduit and positioned between said location and the at least one feed conduit.

(55) An aquaculture assembly according to any clause herein, wherein the oxygen dissolution system is configured to promote inline dissolution of oxygen within the water passing therethrough.

(56) An aquaculture assembly according to any clause herein, wherein the oxygen dissolution system is configured to promote continuous dissolving of oxygen into a continuous water flow so as to raise a dissolved oxygen level in the water.

(57) An aquaculture assembly according to any clause herein, wherein the oxygen dissolution system is configured to continuously injected gaseous oxygen into the pressurized water stream.

(58) An aquaculture assembly according to any clause herein, wherein the oxygen dissolution system is configured to promote continuous dissolution of gaseous oxygen within the pressurized water stream.

(59) An aquaculture assembly according to any clause herein, including a variable speed pump which receives ocean water and outputs a pressurized water stream and wherein adjusting the speed of the pump adjusts at least in part the extent to which oxygen is dissolved within the pressurized water stream.

(60) A method of providing aquaculture feed to an aquaculture enclosure, the method comprising: providing at least one elongate, at least partially curved and/or undulating conduit shaped to convey therethrough pressurized ocean water to the aquaculture enclosure; disposing feed within said conduit; injecting gaseous oxygen into the pressurized ocean water upstream of the feed; using otherwise wasted backpressure from the conduit to facilitate and/or further promote dissolving of the gaseous oxygen therewithin.

(61) A method of providing aquaculture feed to an aquaculture enclosure, the method comprising: disposing feed within a plurality of conduits configured to receive pressurized water therethrough; injecting gaseous oxygen into the water upstream of the feed; using backpressure from the conduits and/or the feed so disposed therein to promote dissolving of the gaseous oxygen therewithin.

(62) A method according to any one of clauses 60 to 61 or any clause herein, including: directing a mix of said feed and said water of higher dissolved oxygen towards the aquaculture enclosure; and/or positioning each said conduit at least in part within an open body of water and/or the ocean.

(63) A method of providing aquaculture feed to an aquaculture enclosure according to any clause herein, including adjusting the extent to which oxygen is dissolved within the water via at least one valve in fluid communication with the conduit.

(64) A method of providing aquaculture feed and/or oxygenated water to at least one sea cage, the method comprising: pumping pressurized ocean water through a conduit system to the at least one sea cage; positioning a feed system in fluid communication with the conduit system so as to selectively direct feed to the sea cage, the conduit system being curved at least in part, undulating at least in part due to the ocean environment and/or having conveyance distances so as to result in economically significant hydraulic head loss; positioning an oxygen dissolution system in-line and in fluid communication with the conduit system upstream of the feed system; and using backpressure otherwise wasted to facilitate and/or promote dissolution of gaseous oxygen within the pressurized ocean water.

(65) A method of providing aquaculture feed and/or oxygenated water to at least one sea cage, the method comprising: outputting a pressurized ocean water stream; positioning an oxygen dissolution system in fluid communication with the pressurized water stream; positioning a feed system in-line with the oxygen dissolution system, the feed system extending towards one or more sea cages; and configuring the oxygen dissolution system to actively use backpressure from the feed system to facilitate and/or further promote dissolution of gaseous oxygen within the pressurized water stream.

(66) A method of providing aquaculture feed and/or oxygenated water to an aquaculture enclosure, the method comprising: dissolving oxygen into water via an oxygen dissolution system so as to output water of elevated dissolved oxygen; degassing undissolved gases within the water; injecting feed into the water of elevated dissolved oxygen so as to form at least one liquid-solid flow of water and feed; and directing the at least one liquid-solid flow of water and feed towards the aquaculture enclosure.

(67) A method of providing aquaculture feed and/or oxygenated water to an aquaculture enclosure, the method comprising: dissolving oxygen into water via an oxygen dissolution system so as to output water of elevated dissolved oxygen; directing the water outputted from the oxygen dissolution system to a plurality of feed conduits configured to receive feed therein; equalizing within a predetermined threshold the flow of water through the feed conduits via one or more valves; injecting feed into the water of elevated dissolved oxygen so as to form at least one liquid-solid flow of water and feed; and directing the at least one liquid-solid flow of water and feed towards the aquaculture enclosure.

(68) A method according to clause 66 or any clause herein, including adjusting the extent to which oxygen is dissolved within the water by adjusting the extent to which the one or more valves are opened.

(69) A method of providing aquaculture feed to an aquaculture enclosure, the method comprising: injecting gaseous oxygen within a conduit configured to receive pressurized water therethrough so as to promote dissolving thereof therewithin; adjusting flow of the water at least in part and/or adjusting the extent to which oxygen is dissolved within the water via at least one valve in fluid communication with the conduit; disposing feed into the water; and directing a mix of said feed and said water of higher dissolved oxygen towards the aquaculture enclosure.

(70) A method of providing aquaculture feed, the method comprising: dissolving oxygen into water via an oxygen dissolution system so as to output water of elevated dissolved oxygen; splitting the water into a plurality of distribution lines; injecting feed into each said distribution line; and adjusting flow through the distribution lines and/or further promoting dissolution of oxygen with the water via water flow balancing valves.

(71) A method of providing aquaculture feed and/or oxygenated water to an aquaculture enclosure according to any clause herein, including pumping water of a first dissolved oxygen concentration to the oxygen dissolution system and dissolving oxygen into the water via the oxygen dissolution system so as to output water of a second dissolved oxygen concentration higher than that of the first dissolved oxygen concentration.

(72) A method according to clause 71 or any clause herein, including equalizing within a predetermined threshold the flow of water through the feed conduits via one or more valves.

(73) A method according to any clause herein, wherein each said valve is a flow balancing said valve.

(74) A method according to any clause herein, including degassing undissolved gases within the water.

(75) A method of providing aquaculture feed and/or oxygenated water to a sea cage, the method comprising: providing an oxygen dissolution system which increases the amount of dissolved oxygen within ocean water passing therethrough; providing a feed system via which the aquaculture feed is selectively directed towards the sea cage; and overlapping the output of the oxygen dissolution system with the input of the feed system.

(76) A method of providing aquaculture feed and/or oxygenated water to a sea cage, the method comprising: providing an oxygen dissolution system which increases the amount of dissolved oxygen within ocean water passing therethrough; providing a feed system via which the aquaculture feed is selectively directed towards the sea cage; and arranging the output of the oxygen dissolution system to be the input of the feed system.

(77) A method according to clause 76 or any clause herein, wherein the feed system includes a conduit system that is curved at least in part, which is undulating at least in part due to the ocean environment and/or which has one or more conveyance distances so as to result in economically significant hydraulic head loss.

(78) A method according to any clause herein, including injecting gaseous said oxygen into the oxygen dissolution system.

(79) A method according to any clause herein, including configuring the oxygen dissolution system to actively use backpressure from the feed system to further promote oxygen dissolution.

(80) A method according to any clause herein, including: providing one or more valves between the oxygen dissolution system and the feed system.

(81) A method according to any clause herein, including: providing one or more valves downstream of the oxygen dissolution system.

(82) A method according to any clause herein, including: adjusting the extent to which oxygen is dissolved in said output water of elevated dissolved oxygen by adjusting positioning of the one or more valves.

(83) A method according to any clause herein, including: using water backpressure arising from the one or more valves to promote dissolution of oxygen within said output water of elevated dissolved oxygen.

(84) A method according to any clause herein, including: positioning the one or more valves to inhibit damage to the feed.

(85) A method according to any clause herein, including: positioning the one or more valves upstream of the feed.

(86) A method according to any clause herein, including: positioning the one or more valves such that adjustment of oxygenation levels of said output water of elevated dissolved oxygen is independent of feed rate.

(87) A method according to any clause herein, including positioning a manifold downstream of the oxygen dissolution system; and using water backpressure arising from the manifold to promote dissolution of oxygen within said output water of elevated dissolved oxygen.

(88) A method according to any clause herein, including pumping water of a first dissolved oxygen concentration to the oxygen dissolution system and dissolving oxygen into the water via the oxygen dissolution system so as to output water of a second dissolved oxygen concentration higher than that of the first dissolved oxygen concentration.

(89) A method according to any clause herein, including directing the water outputted from the oxygen dissolution system to a plurality of feed conduits configured to receive feed therein.

(90) A method according to any clause herein, including equalizing within a predetermined threshold the flow of water through the feed conduits via one or more valves.

(91) A method according to any clause herein, including: operatively connecting a plurality of water flow meters each to a respective said feed conduit; determining the flows of water through the feed conduits via a processor in communication with the water flow maters; and equalizing the flows of water through the feed conduits within a predetermined threshold via one or more valves which are selectively adjusted via the processor based on said determination.

(92) A method according to any clause herein, including adjusting the extent to which oxygen is dissolved within the water by adjusting the extent to which the one or more valves are opened.

(93) A method according to any clause herein, wherein each said valve is a flow balancing said valve.

(94) A method according to any clause herein, including degassing undissolved gases within the water.

(95) A method according to any clause herein, including degassing undissolved gases within the water upstream of the feed system.

(96) A method according to any clause herein, including degassing undissolved gases within the water upstream of each said valve.

(97) A method according to any clause herein, including degassing undissolved gases within the water upstream of the manifold.

(98) A method according to any clause herein, including degassing undissolved gases within the water via an enclosure shaped to receive the water therethrough, with the enclosure having one or more apertures extending therein, and the one or more apertures of the enclosure being shaped to enable undissolved gases from the water to selectively exit therefrom at least in part.

(99) A method according to any clause herein, including: positioning one or more valves between the oxygen dissolution system and the feed system; and incorporating water backpressure arising from the one or more valves to promote dissolution of oxygen within said output water of elevated dissolved oxygen.

(100) A method of providing aquaculture feed, the method comprising: dissolving oxygen into water via an oxygen dissolution system so as to output water of elevated dissolved oxygen; splitting the water so outputted into a plurality of distribution lines; and injecting feed into each said distribution line.

(101) A method of providing aquaculture feed, the method comprising: dissolving oxygen into water via an oxygen dissolution system so as to output water of elevated dissolved oxygen; splitting the water into a plurality of distribution lines; injecting feed into each said distribution line; and adjusting flow through the distribution lines and/or further promoting dissolution of oxygen with the water via water flow balancing valves.

(102) A method according to any clause herein, including: configuring the oxygen dissolution system to promote inline dissolution of oxygen within the water passing therethrough.

(103) A method according to any clause herein, including: configuring the oxygen dissolution system to promote continuous dissolving of oxygen into a continuous water flow so as to raise a dissolved oxygen level in the water.

(104) A method of providing aquaculture feed and/or oxygenated water to an aquaculture enclosure, the method comprising: dissolving oxygen into water via an oxygen dissolution system so as to output water of elevated dissolved oxygen; and increasing pressure in the upstream oxygen dissolution system by positioning downstream thereof two or more of a manifold, feed delivery conduits, water flow meters and flow balancing valves.

(105) A method of providing aquaculture feed and/or oxygenated water to an aquaculture enclosure, the method comprising: dissolving oxygen into water via an oxygen dissolution system so as to output water of elevated dissolved oxygen; and increasing pressure in the upstream oxygen dissolution system by positioning downstream thereof three or more of a manifold, feed delivery conduits, water flow meters and flow balancing valves.

(106) A method of providing aquaculture feed and/or oxygenated water to an aquaculture enclosure, the method comprising: dissolving oxygen into water via an oxygen dissolution system so as to output water of elevated dissolved oxygen; and increasing pressure in the upstream oxygen dissolution system by positioning downstream thereof a manifold, feed delivery conduits, water flow meters and flow balancing valves.

(107) A method according to any clause herein, wherein the manifold operatively couples together the oxygen dissolution system and the feed delivery conduits, wherein each said water flow meter operatively couples to a respective said feed delivery conduit and wherein each said flow balancing valve operatively couples to a respective said feed delivery conduit.

(108) A method of providing aquaculture feed and/or oxygenated water to an aquaculture enclosure, the method comprising: dissolving oxygen into water via an oxygen dissolution system so as to output water of elevated dissolved oxygen; positioning two or more of a manifold, feed delivery conduits, water flow meters and flow balancing valves downstream of the oxygen dissolution system; and leveraging backpressure from the two or more of said manifold, said feed delivery conduits, said water flow meters and said flow balancing valves, to promote further dissolution of oxygen into the water.

(109) A method of providing aquaculture feed and/or oxygenated water to an aquaculture enclosure, the method comprising: dissolving oxygen into water via an oxygen dissolution system so as to output water of elevated dissolved oxygen; positioning three or more of a manifold, feed delivery conduits, water flow meters and flow balancing valves downstream of the oxygen dissolution system; and leveraging backpressure from the three or more of said manifold, said feed delivery conduits, said water flow meters and said flow balancing valves, to promote further dissolution of oxygen into the water.

(110) A method of providing aquaculture feed and/or oxygenated water to an aquaculture enclosure, the method comprising: dissolving oxygen into water via an oxygen dissolution system so as to output water of elevated dissolved oxygen; positioning a manifold, feed delivery conduits, water flow meters and flow balancing valves downstream of the oxygen dissolution system; and leveraging backpressure from the manifold, said feed delivery conduits, said water flow meters and said flow balancing valves, to promote further dissolution of oxygen into the water.

(111) A method according to any clause herein, outputting via a variable speed pump a pressurized ocean water stream with which the oxygen dissolution system is in fluid communication; and adjusting at least in part the extent to which oxygen is dissolved within the pressurized water stream by adjusting the speed of the pump.

(112) Use of the aquaculture assembly according to any clause herein for open bodies of water, ocean applications and/or sea cages.

(113) Apparatus comprising any new useful and inventive feature, combination of features or sub-combination of features described or clearly inferred herein.

(114) A method comprising any new, useful and inventive step, act, combination of steps and/or acts, or sub-combination of steps and/or acts described or clearly inferred herein.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed:

1. An aquaculture assembly comprising:
a pump for outputting water of a first concentration of dissolved oxygen;
an oxygen dissolution system operatively connected to the pump so as to receive said water of the first concentration of dissolved oxygen, with the oxygen dissolution system outputting water of a second concentration of dissolved oxygen higher than that of the first concentration of dissolved oxygen;
a manifold operatively connected to the oxygen dissolution system so as to receive said water of the second concentration of dissolved oxygen;
a plurality of valves in fluid communication with respective outlets of the manifold, wherein a first valve of said plurality of valves associated with a sea cage that is closer, is more closed compared to a second valve of said plurality of valves associated with a sea cage that is more distant, to promote a consistent backpressure across multiple said outlets within a predetermined threshold; and
a plurality of feed injection conduits operatively connected to respective said valves.

2. An aquaculture assembly according to claim 1, wherein the manifold is downstream of the oxygen dissolution system and upstream of the plurality of feed injection conduits.

3. An aquaculture assembly according to claim 1, wherein the plurality of valves are flow balancing valves which are selectively adjustable to promote flows of water through the feed injection conduits that are equal to each other within a predetermined threshold.

4. An aquaculture assembly according to claim 1, wherein said backpressure promotes dissolution of oxygen within the assembly.

5. An aquaculture assembly according to claim 1, wherein each said feed injection conduit outputting into a respective said sea cage a liquid-solid flow of water with an elevated concentration of dissolved oxygen together with feed dispersed therewithin.

6. An aquaculture assembly according to claim 1, wherein the plurality of valves are upstream of said feed injection conduits and wherein feed is injected into the feed injection conduits.

7. An aquaculture assembly according to claim 1, wherein each said valve is positioned such that adjustment of the extent to which oxygen is dissolved within the water via said valve is independent of feed rate.

8. An aquaculture assembly according to claim 1, wherein the assembly is configured to enable the extent to which oxygen is dissolved within the water to be adjustable via selectively adjusting positioning of the valves.

9. An aquaculture assembly according to claim 1, including a plurality of water flow meters downstream of the oxygen dissolution system, the plurality of water flow meters being inline with and/or operatively connecting to respective said feed injection conduits.

10. An aquaculture assembly according to claim 9, including a processor in communication with the plurality of water flow meters, wherein the processor selectively actuates or adjusts one or more of the plurality of valves based on input from the water flow meters so as to promote water flows within the feed injection conduits that are equal within a predetermined threshold.

11. An aquaculture assembly according to claim 9, wherein the plurality of flow meters create additional backpressure used to promote dissolving of oxygen within the assembly.

12. An aquaculture assembly according to claim 1, including a processor in communication with the plurality of valves, wherein the processor selectively adjusts and/or actuates one or more of the plurality of valves to vary and/or control the extent to which oxygen is dissolved within the feed injection conduits.

13. An aquaculture assembly according to claim 1, including a degassing system via which undissolved gases are selectively released, the degassing system being downstream of the oxygen dissolution system and upstream of the feed injection conduits.

14. An aquaculture assembly according to claim 1, including an elongate conduit system comprising said feed injection conduits, wherein the conduit system extends from the pump to said sea cages, and wherein the conduit system undulates at least in part and/or spans conveyance distances.

15. An aquaculture assembly according to claim 1, wherein the pump is a variable speed pump, and wherein adjusting the speed of the variable speed pump adjusts at least in part the extent to which oxygen is dissolved within the water and/or assembly.

16. A method of providing aquaculture feed and oxygenated water to a plurality of sea cages, the method comprising:

dissolving oxygen into water via an oxygen dissolution system so as to output water of elevated dissolved oxygen;

splitting the water of elevated dissolved oxygen into a plurality of distribution lines whose outlets are in fluid communication with respective said sea cages;

injecting feed into each said distribution line; and adjusting flow through the distribution lines via water flow balancing valves, including adjusting a first water flow balancing valve of said water flow balancing valves associated with a sea cage of said plurality of sea cages that is closer to be more closed compared to a second water flow balancing valve of said water flow balancing valves associated with a sea cage of said plurality of sea cages that is more distant, to promote a consistent backpressure across multiple said outlets within a predetermined threshold.

17. A method according to claim 16, including operatively connecting together the oxygen dissolution system and the plurality of distribution lines via a manifold positioned upstream of the injecting of the feed.

18. A method according to claim 16, including adjusting the extent to which oxygen is dissolved within the water by adjusting the extent to which respective ones of the water flow balancing valves are opened.

19. A method according to claim 16, including equalizing within a predetermined threshold the flow of water through the outlets via the water flow balancing valves.

20. A method according to claim 16, wherein the plurality of distribution lines comprises a conduit system which is curved at least in part, which is undulating at least in part due to the ocean environment and/or which has one or more conveyance distances.

21. An aquaculture assembly comprising:

a pump for outputting water of a first concentration of dissolved oxygen;

an oxygen dissolution system operatively connected to the pump so as to receive said water of the first concentration of dissolved oxygen, with the oxygen dissolution system outputting water of a second concentration of dissolved oxygen higher than that of the first concentration of dissolved oxygen;

a manifold operatively connected to the oxygen dissolution system so as to receive said water of the second concentration of dissolved oxygen;

a plurality of spaced-apart sea cages;

a plurality of valves in fluid communication with respective outlets of the manifold, wherein a first said valve of said plurality of valves associated with a closer sea cage of said plurality of spaced-apart sea cages that is closer, is more closed compared to a second said valve of said plurality of valves associated with a more distant sea cage of said plurality of spaced-apart sea cages that is more distant, to promote a consistent backpressure across multiple said outlets within a predetermined threshold; and a plurality of feed injection conduits operatively connected to respective said valves.

* * * * *